United States Patent
Noguchi et al.

(10) Patent No.: US 6,291,379 B1
(45) Date of Patent: Sep. 18, 2001

(54) PROCESS FOR PRODUCTION OF CORDIERITE-BASED CERAMIC HONEYCOMB STRUCTURE

(75) Inventors: Yasushi Noguchi; Kyoko Makino, both of Nagoya (JP); Wataru Kotani, Mooresville, NC (US)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/493,206

(22) Filed: Jan. 28, 2000

(30) Foreign Application Priority Data

Feb. 3, 1999 (JP) .................................................. 11-026499

(51) Int. Cl.$^7$ .................................................. C04B 35/195
(52) U.S. Cl. ............................ 501/118; 501/119; 264/631
(58) Field of Search ..................................... 501/118, 119; 264/631

(56) References Cited

U.S. PATENT DOCUMENTS

| | | | |
|---|---|---|---|
| 4,772,580 | * 9/1988 | Hamanaka et al. | 502/439 |
| 4,877,670 | * 10/1989 | Hamanaka | 426/116 |
| 5,030,398 | * 7/1991 | Hamanaka et al. | 264/631 |
| 5,258,150 | * 11/1993 | Merkel et al. | 264/631 |
| 5,262,102 | * 11/1993 | Wada | 264/631 |
| 5,409,870 | * 4/1995 | Locker et al. | 501/119 |
| 5,916,511 | * 6/1999 | Kotani et al | 264/631 |
| 5,938,992 | * 8/1999 | Hamanaka et al. | 264/631 |
| 6,004,501 | * 12/1999 | Cornelius et al. | 264/631 |
| 6,048,490 | * 4/2000 | Cornelius et al. | 264/631 |

FOREIGN PATENT DOCUMENTS

| | | |
|---|---|---|
| 4-70053 | 10/1987 | (JP) . |
| 11-79831 | * 3/1999 | (JP) . |

* cited by examiner

*Primary Examiner*—Karl Group
(74) *Attorney, Agent, or Firm*—Parkhurst & Wendel, L.L.P.

(57) ABSTRACT

A process for producing a cordierite-based ceramic honeycomb structure, includes kneading raw materials for cordierite with a forming aid to obtain a raw material batch, subjecting the raw material batch to obtain a honeycomb structure, and subjecting the honeycomb structure to drying and firing in this order to obtain a ceramic honeycomb structure whose crystal phase is composed mainly of cordierite. The raw material batch contains 65% by weight or more of raw materials for cordierite, comprising talc, kaolin and aluminum hydroxide and having crystal water. The kaolin has an average particle diameter of 5 $\mu$ or more and a BET specific surface area of 10 m$^2$/g or less and is contained in the raw material batch in an amount of 10% or more by weight. Formability during extruding, particularly lubricity and shape stability, are improved, for producing cordierite-based ceramic honeycomb structure having thin partition walls and high cell density, and improved mechanical strength (isostatic fracture strength) and improved catalyst coatability.

5 Claims, 1 Drawing Sheet

PROCESS FOR PRODUCTION OF CORDIERITE-BASED CERAMIC HONEYCOMB STRUCTURE

BACKGROUND OF THE INVENTION AND RELATED ART STATEMENT

The present invention relates to a process for producing a cordierite-base ceramic honeycomb structure by extruding.

Cordierite-based ceramic honeycomb structures are in use as a carrier for exhaust gas purification catalyst for use in automobiles and various industries, a filter, a heat exchanger, etc.

In recent years, with the progress of technologies, it has been strongly desired to improve the ceramic honeycomb carrier for catalyst used particularly in the exhaust gas system of automobiles. Desired improvements were in (1) volume (smaller volume), so as to obtain better catalytic performance and better light-off performance, in (2) pressure loss (lower pressure loss) for improved fuel consumption and higher engine output, in (3) strength for reduced cost of canning into casing, and in (4) thermal shock resistance and strength for mounting close to engine and resultant higher catalytic activity.

In this connection, investigations have been made to develop a honeycomb structure with thinner ribs and higher cell density, for improved catalytic performance and to produce a honeycomb structure with thinner ribs, having a required cell density, for lower pressure loss. Use of thinner ribs in porous cordierite-based ceramic honeycomb structures produced problems of (a) reduced strength and (b) a substantially increased thermal expansion coefficient caused by the use of die of smaller slit width in extruding and consequent necessity to use finer materials (particularly, magnesia source material).

It was difficult to allow a cordierite-based ceramic honeycomb structure to have a high density.

Particularly, when raw materials were used for cordierite formation having a low thermal expansion coefficient of $2.0 \times 10^{-6}/°C$. or less in a temperature range from room temperature to 800° C. was used, it was necessary to minimize amounts of impurities (which become a flux) such as calcia, alkali or sodium. Consequently, the cordierite-based ceramic honeycomb structure obtained had a very small amount of a vitreous phase and it was porous.

In order to alleviate this problem, attempts were tried using raw materials of low impurity content, for example, severely selected talc, kaolin, alumina, etc. The honeycomb structure obtained, however, had a porosity of as low as 20 to 45%.

It was necessary that a cordierite-based ceramic honeycomb structure, when used as a carrier for an automobile exhaust gas purification catalyst, had a thermal expansion coefficient of $1.5 \times 10^{-6}/°C$. or less.

In the case of a honeycomb structure having a porosity of 30% or less, use of an increased amount of an impurity and fine raw materials were necessary and consequently it was impossible to obtain a honeycomb structure having a thermal expansion coefficient of $1.0 \times 10^{-6}/°C$. or less in a temperature range from room temperature to 800° C.

A cordierite-based ceramic honeycomb structure of relatively low porosity shows a large shrinkage in drying and firing steps and easily generates cracks. Therefore, it was difficult to produce such a honeycomb structure in a high yield and in a large size.

In order to alleviate these problems, JP-B-4-70053 disclosed a method for obtaining a cordierite ceramic having a higher strength by controlling its porosity at 30% or less, i.e. making it more dense.

Thereby, it was possible to prevent, in a honeycomb structure, the reduction in isostatic strength (which is a compressional load applied from the outer wall and circumference of the honeycomb structure), caused by the deformation of honeycomb cells arising during extruding.

In the above method, however, since the cordierite-based ceramic honeycomb structure has a porosity of 30% or less, the honeycomb structure did not have high catalyst coatability; the formability during extruding was not good; and the honeycomb structure had neither sufficiently thin wall thickness nor sufficiently high cell density.

SUMMARY OF THE INVENTION

In view of the above-mentioned problems of the prior art, the present invention has an object of providing a process for producing a cordierite-based ceramic honeycomb structure, wherein the formability during extruding, particularly the lubricity and the shape stability, is improved and which can produce a cordierite-based ceramic honeycomb structure having a thin partition wall and a high cell density and possessing an improved mechanical strength (isostatic fracture strength) and an improved catalyst coatability.

According to the present invention, there is provided a process for producing a cordierite-based ceramic honeycomb structure, which comprises: kneading raw materials for cordierite formation with a forming aid to obtain a raw material batch, subjecting the raw material batch to extruding to obtain a honeycomb structure, and subjecting the formed honeycomb structure to drying and firing in this order to obtain the cordierite-based ceramic honeycomb structure whose crystal phase is composed mainly of cordierite, wherein the raw material batch contains 65% by weight or more of raw materials for cordierite formation comprising talc, kaolin and aluminum hydroxide and having crystal water, and where the kaolin has an average particle diameter of 5 μm or more and a BET specific surface area of 10 m²/g or less and is contained in the raw material batch in an amount of 10% by weight or more.

In the present process, the kaolin preferably has a value of (average particle diameter)/(BET specific surface area), of 1 or more.

Further in the present process, the raw materials for cordierite formation preferably have, by sifting, a particle size of less than the slit width of the extrusion die used.

Furthermore in the present process, the cordierite-based ceramic honeycomb structure has a thermal expansion coefficient of $0.8 \times 10^{-6}/°C$. or less between 40° C. and 800° C., in the passage direction, a porosity of 24 to 38%, and an isostatic strength of 10 kgf/cm² or more.

DETAILED DESCRIPTION OF THE INVENTION

Figure 1:
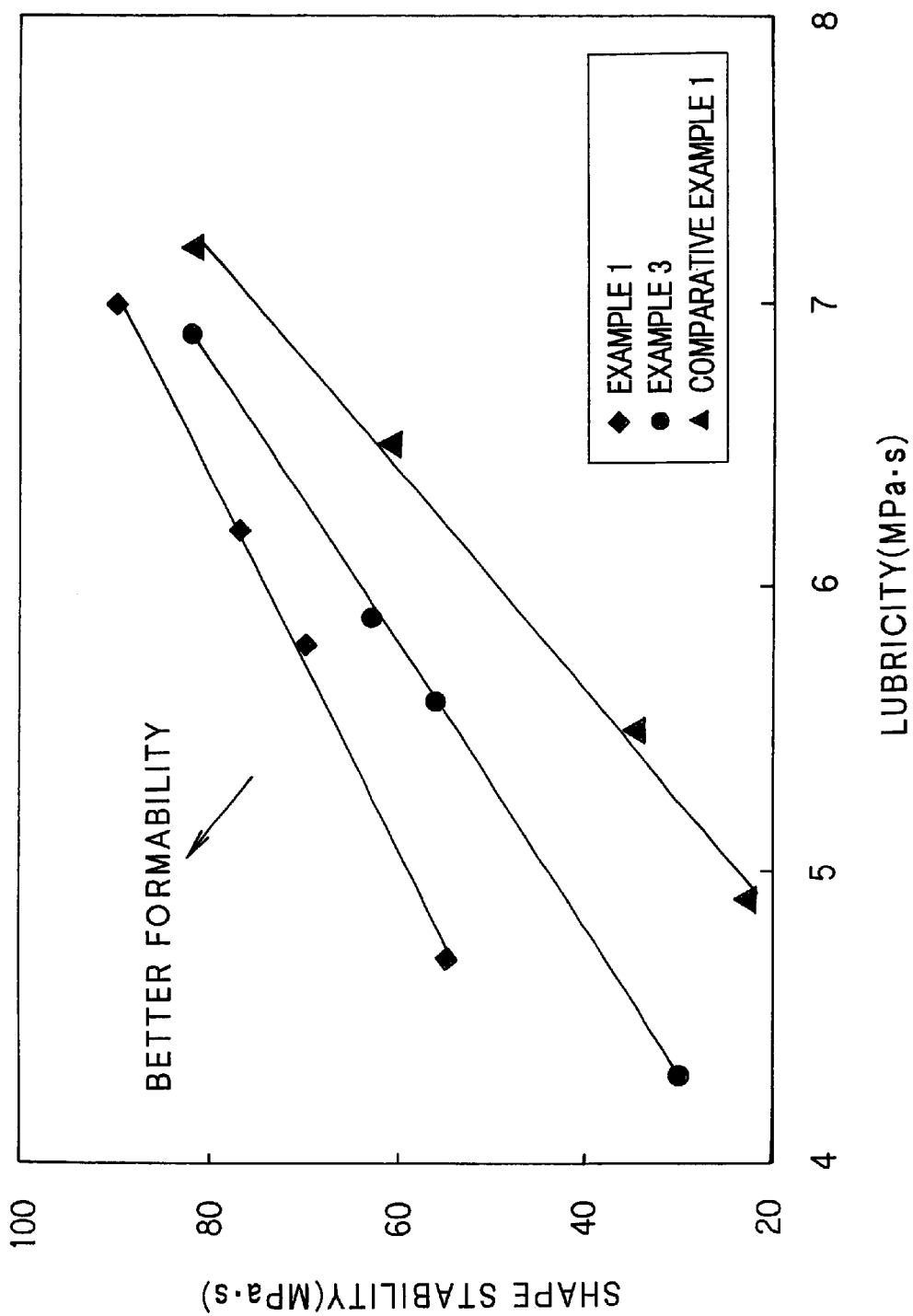
FIG. 1 is a graph showing the relations between lubricity and shape stability when water was added to a raw material batch for cordierite formation, obtained in Example 1, Example 3 and Comparative Example 1.

In the process for producing a cordierite-based ceramic honeycomb structure according to the present invention, the raw material batch for extruding contains 65% by weight or more of raw materials for cordierite formation comprising talc, kaolin and aluminum hydroxide and having crystal water.

Thereby, the material for extruding can show improved lubricity during extruding and impart improved shape stability to the formed honeycomb structure.

In the present process for producing a cordierite-based ceramic honeycomb structure, it is important that as the raw materials for cordierite formation, there are used three kinds of raw materials, i.e. talc, kaolin and aluminum hydroxide, as mentioned above.

The content of the raw materials for cordierite formation in the raw material batch is preferably 65% by weight or more, more preferably 70% by weight or more in order to prevent the increase in extrusion pressure during extruding and improve the shape stability of the formed honeycomb structure.

It is also preferred that the amounts of the calcined talc, calcined kaolin and alumina in the raw material batch are minimized, because an increase in the amounts strikingly deteriorates the lubricity of the batch.

The raw materials for cordierite formation are suitable for extruding a cordierite-based ceramic honeycomb structure having a thin partition wall and no cell deformation, but they generate cracks in the honeycomb structure when fired.

Therefore, in the present process for producing a cordierite-based ceramic honeycomb structure, it is important to allow the raw material batch to contain kaolin having an average particle diameter of 5 $\mu$m or more and a BET specific surface area of 10 m$^2$/g or less, in an amount of 10% by weight or more.

By allowing the raw material batch to contain kaolin having the above properties in the above amount, it is possible to minimize the amount of water required for obtaining an extrudable material. Consequently, the apparent volume fraction of particles in the material can be made large and the distance between particles can be made small.

With such a material for extruding, it is possible to shorten, in extruding, the time required from receipt of strain by shear to release from shear and subsequent recovery (recoagulation). Thereby, the formed honeycomb structure is improved in shape stability.

In this case, the kaolin preferably has a value of (average particle diameter)/(BET specific surface area), of 1 or more.

Use, in the raw material batch, of kaolin having a small average particle diameter of less than 5 $\mu$m and a high BET specific surface area of more than 10 m$^2$/g is not preferred for the following reasons. First, such kaolin has a higher surface energy and accordingly gives a raw material batch of a higher energy. As a result, a larger amount of water is required to obtain an extrudable material. In the extrudable material, the apparent volume fraction of particles is smaller and the distance between particles is larger. In extruding, the time required from receipt of strain by shear to release from shear and subsequent recovery (recoagulation) is longer; thereby, the formed honeycomb structure has a low shape stability.

By allowing the kaolin having the above-mentioned properties to be present in the raw material batch in an amount of 10% by weight or more, preferably 15 to 25% by weight, the property of kaolin of being a unique powder (that is, the powder is an inorganic electrolyte and, in the presence of water, its end is charged negatively and its parting plane is charged positively) can be sufficiently reflected in the Theological property of the raw material batch. Therefore, there can be obtained a favorable material for extruding which can be easily deformed in a high shear state when passed through an extrusion die and which is resistant to deformation in a shear-free state after having been passed through the extrusion die.

The raw materials for cordierite formation used in the raw material batch of the present invention preferably have by sifting, a particle size of less than the slit width of the extrusion die used.

Thereby, it is possible to prevent the clogging of the slits of the extrusion die with the raw material batch and to obtain a good formed honeycomb structure having no defects in the honeycomb ribs.

The talc used in the raw materials for cordierite formation is preferably a microtalc consisting of small single crystals.

The aluminum hydroxide used in the raw materials for cordierite formation is preferably one having a high BET specific surface area obtained by crystallization by Bayer's process and by subsequent grinding for thin layer formation.

The BET specific surface area refers to a surface area of solid per mass, determined by the gas adsorption theory of Brunauer, Emmett and Teller (BET isothermal equation), wherein the surface area is determined by calculating the area of multimolecular layer.

The cordierite-based ceramic honeycomb structure obtained by the present process, preferably has a thermal expansion coefficient of $0.8 \times 10^{-6}$/°C. or less between 40° C. and 800° C. in the passage direction of the honeycomb structure.

A thermal expansion coefficient of more than $0.8 \times 10^{-6}$/°C. is not preferred because the cylindrical honeycomb structure (the diameter is about 100 mm) obtained has a thermal shock resistance of less than 700° C. and is unusable as a carrier for automobile exhaust gas purification catalyst.

Next, a detailed description is made on the present process for producing a cordierite-based ceramic honeycomb structure.

The raw material batch for the cordierite-based ceramic honeycomb structure contains 65% by weight or more of raw materials for cordierite formation comprising talc, kaolin and aluminum hydroxide and the remainder comprising calcined kaolin, alumina, silica, calcined talc, etc. so that the chemical composition of the main components in raw material batch becomes 42 to 56% by weight of SiO$_2$, 30 to 45% by weight of Al$_2$O$_3$ and 12 to 16% by weight of MgO. To this raw material batch are added water, an organic binder (e.g. methyl cellulose) and a surfactant; the mixture is kneaded; the kneaded material is subjected to extruding to obtain a formed honeycomb structure; the formed honeycomb structure is dried and then fired at a temperature of 1,350 to 1,440° C.; thereby, a cordierite-based ceramic honeycomb structure (a fired honeycomb structure) can be obtained.

In the above procedure, by allowing the raw material batch to contain kaolin having an average particle diameter of 5 $\mu$m or more and a BET specific surface area of 10 m$^2$/g or less in an amount of a given amount (10% by weight or more), there can be obtained a material for extruding which is superior in lubricity during extruding and further has shape stability (causes no gravity deformation) after extruding. As a result, there can be produced a honeycomb structure of thin partition wall and high cell density (e.g. a partition wall thickness of 40 $\mu$m and a cell density of 200 cells/cm$^2$).

By producing, as above, a honeycomb structure of a thin partition wall, the cell deformation of the formed honeycomb structure can be made very low. The thermal expansion coefficient of the fired honeycomb structure can be made very small. The isostatic strength in a fired honeycomb structure having a porosity of 24 to 38% can be made 10 kgf/cm² or more and the catalyst coatability in a fired honeycomb structure having a porosity of 30% or more can be improved.

The temperature elevation rate of aluminum hydroxide or kaolin in the temperature range for crystal water removal is preferably controlled at 50° C./hr or less in order to prevent crack generation in the cordierite-based ceramic honeycomb structure. Binder removal before firing is also effective for preventing crack generation in the cordierite-based ceramic honeycomb structure.

EXAMPLES

The present invention is described in more detail below by way of Examples. However, the present invention is in no way to be restricted by these Examples.

The raw materials for cordierite formation, each formed honeycomb structure and each fired honeycomb structure obtained in the Examples were measured for properties according to the following methods.

Lubricity of Material for Extruding

A material for extruding was extruded into a honeycomb shape from an extrusion die of 100 μm in slit width, at a given plunger pressure, and the extrusion speed was measured. From the pressure, extrusion speed and slit width was calculated the shear rate of the material for extruding during the passage through the extrusion die. The shear rate was converted into the apparent viscosity (MPa.s) of the material for extruding.

The smaller the apparent viscosity (which is an indication of lubricity), the better is the lubricity of the material for extruding.

Shape Stability of Formed Honeycomb Structure

A material for extruding was extruded from a plunger to form a solid material of 25 mm in diameter and 30 mm in length. The formed solid material was compressed at a compression speed of 1 mm/s using an autograph and a load (kgf) was measured. From the stress-strain curve was calculated a Young's modulus, from which an apparent viscosity (MPa.s) was calculated.

The larger the apparent viscosity (which is an indication of shape stability), the better is the shape stability of the formed honeycomb structure.

Number of Defective Ribs

A honeycomb material having a given partition wall thickness, a diameter of 100 mm, and 62 square cells per cm² was formed by extruding so as to have a length of 100 m, and the number of defective cells was measured.

Viscosity

Measured using Sedigraph (X-ray sedimentation method) produced by Micromeritech Co.

BET Specific Surface Area

Measured using Flowsorb II 2300 produced by Micromeritech Co. A mixed gas consisting of He (30%) and $N_2$ (70%) was used as an adsorption gas.

Porosity

Porosity was calculated from the total pore volume obtained by mercury porosimetry. The absolute specific gravity of cordierite was taken as 2.52.

Thermal Shock Resistance

A fired honeycomb structure of room temperature was placed in an electric furnace, kept for 30 minutes, and returned to room temperature. The resulting material was examined for fracture by hitting it and listening to the sound. (Step up from 600° C. by 50° C., safety temperature (°C.) is shown.)

Isostatic Strength

A fired honeycomb material was inserted into a flexible tube and a hydrostatic pressure was applied to the honeycomb structure. A pressure (kgf/cm²) at which partial fracture appeared, was measured, and an average of 10 samples was calculated.

Examples 1 to 8 and Comparative Examples 1 to 4

Raw materials for cordierite formation were mixed according to the formulation shown in Table 1. To 100% by weight of the raw materials were added (a) 4% by weight of methyl cellulose and (b) water. Kneading was conducted to obtain an extrudable material. The material was measured for lubricity and the result is shown in Table 2.

TABLE 1

| | Properties of Kaolin | | | Composition (wt. %) | | | | | | | Total of kaolin, talc and aluminum hydroxide (wt. %) | Total of raw materials for cordierite formation (wt. %) |
|---|---|---|---|---|---|---|---|---|---|---|---|---|
| | BET specific surface area (m²/g) | Average particle diameter (μm) | (Average particle diameter)/ (BET) | Kaolin | Talc A | Talc B | Calcined Kaolin | Alumina | Aluminume hydroxide | Silica | | |
| Example 1 | 4 | 15 | 3.750 | 21 | 39 | — | 13 | 9 | 13 | 5 | 73 | 100 |
| Example 2 | 6 | 11 | 1.833 | 21 | — | 39 | 13 | 9 | 13 | 5 | 73 | 100 |
| Example 3 | 8 | 9 | 1.125 | 21 | — | 39 | 13 | 9 | 13 | 5 | 73 | 100 |
| Example 4 | 10 | 10 | 1.000 | 21 | — | 39 | 13 | 9 | 13 | 5 | 73 | 100 |
| Example 5 | 10 | 10 | 1.000 | 10 | — | 39 | 23 | 7 | 16 | 5 | 65 | 100 |
| Example 6 | 8 | 9 | 1.125 | 34 | — | 39 | 7 | 11 | 7 | 2 | 80 | 100 |
| Example 7 | 6 | 11 | 1.833 | 47 | — | 39 | 0 | 14 | 0 | 0 | 86 | 100 |
| Example 8 | 5 | 5 | 1.000 | 21 | — | 39 | 22 | 5 | 13 | 0 | 73 | 100 |
| Comparative Example 1 | 12 | 4 | 0.333 | 21 | — | 39 | 23 | 9 | 8 | 0 | 68 | 100 |
| Comparative Example 2 | 6 | 11 | 1.833 | 7 | — | 40 | 26 | 9 | 13 | 5 | 60 | 100 |
| Comparative Example 3 | 4 | 15 | 3.750 | 21 | 41 | — | 10 | 21 | 0 | 7 | 62 | 100 |
| Comparative Example 4 | 6 | 11 | 1.833 | 21 | — | 39 | 13 | 9 | 13 | 5 | 73 | 100 |

Next, the extrudable material (raw material batch) was subjected to extruding by known extruding method to form a cylindrical honeycomb structure (formed honeycomb structure) having a given partition wall thickness (see width of slit shown in Table 2), a cell density of 62 square cells/cm², a diameter of 103 mm and a height of 120 mm.

The formed honeycomb structure was dried and fired to obtain a fired honeycomb structure.

The formed honeycomb structure was measured for shape stability and number of defective ribs, and the fired honeycomb structure was measured for thermal expansion coefficient in a temperature range from 40 to 800° C. in passage direction, porosity, thermal shock resistance and isostatic strength. The results of measurements are shown in Table 2.

smaller than the slit width of extrusion die. Therefore, there was no plugging in the slits of extrusion die and there could be obtained a satisfactory formed honeycomb structure substantially free from rib defect.

Meanwhile, in Comparative Example 1, there was used kaolin having an average particle diameter of 4 μm and a BET specific surface area of 12 $m^2$/g and the viscosity (as an indication of shape stability) at a viscosity (as an indication

TABLE 2

|  | Sifting of raw materials for cordierite formulation | Width of die slit in extrusion worlding (μm) | Properties of molded honeycom material | | | Properties of fired honeycom material | | | |
|---|---|---|---|---|---|---|---|---|---|
|  |  |  | Fluidity (MPa · s) | Shape retainability (MPa · s) | Number of defective ribs | Thermal expansion coefficient between 40° C. and 800° C. ($10^{-6}$/° C.) | Porosity (%) | Thermal shock resistance (° C.) | Isostatic strength (kgf/$cm^2$) |
| Example 1 | Yes | 110 | 5.8 | 70 | 0 | 0.8 | 38 | 750 | 70 |
| Example 2 | Yes | 75 | 5.3 | 53 | 0 | 0.6 | 35 | 800 | 40 |
| Example 3 | Yes | 75 | 5.6 | 56 | 0 | 0.5 | 30 | 825 | 45 |
| Example 4 | Yes | 55 | 5.4 | 52 | 3 | 0.4 | 28 | 850 | 10 |
| Example 5 | Yes | 110 | 5.5 | 40 | 0 | 0.35 | 28 | 825 | 50 |
| Example 6 | Yes | 75 | 5.7 | 61 | 0 | 0.6 | 32 | 800 | 65 |
| Example 7 | Yes | 75 | 5.1 | 59 | 0 | 0.65 | 36 | 775 | 30 |
| Example 8 | Yes | 44 | 5.6 | 60 | 1 | 0.2 | 24 | 900 | 35 |
| Comparative Example 1 | Yes | 90 | 5.5 | 35 | 0 | 0.4 | 20 | 825 | 5 |
| Comparative Example 2 | Yes | 110 | 5.2 | 33 | 0 | 0.55 | 32 | 800 | 8 |
| Comparative Example 3 | Yes | 180 | 5.6 | 38 | 0 | 1.0 | 40 | 650 | 6 |
| Comparative Example 4 | No | 75 | 5.6 | 59 | 25 | 0.6 | 35 | 700 | 8 |

Study for Examples 1 to 8 and Comparative Examples 1 to 4

FIG. 1 is a graph showing the relationship between lubricity and shape stability when water was added to a raw material batch, obtained in Example 1, Example 3 and Comparative Example 1.

There was studied the level of a viscosity (as an indication of shape stability) at a viscosity (as an indication of lubricity) of 5.5 MPa.s, in view of the extrusion speed, i.e. productivity of honeycomb.

Incidentally, it is known that the viscosity (an indication of shape stability) at which a honeycomb of thin partition wall having an average thickness of 110 μm or less can be extruded with no inconvenience (e.g. deformation), is 40 MPa.s.

In each of Examples 1 and 3, there was used kaolin having an average particle diameter of 5 μm or more and a BET specific surface area of 10 $m^2$/g or less; therefore, the viscosity (as an indication of shape stability) at a viscosity (as an indication of lubricity) of 5.5 MPa.s was 40 MPa.s or more in each Example and a thin-wall honeycomb having an average partition wall thickness of 110 μm or less could be formed at a high yield.

In Example 1, as compared with Example 3, the kaolin used had a larger value of (average particle diameter)/(BET specific surface area); therefore, the material for extruding had higher formability.

In each of Examples 1 to 8, there was used kaolin having an average particle diameter of 5 μm or more and a BET specific surface area of 10 $m^2$/g or less, and the raw materials for cordierite formation used had, by sifting, a particle size of lubricity) of 5.5 MPa.s was 35 MPa.s. When a thin-wall honeycomb having an average wall thickness of 110 μm or less was formed, there appeared cell deformation and surface cutting/fine splitting, and no satisfactory formed structure could be obtained. The productivity was strikingly low and the fired honeycomb structure had an isostatic fracture strength of only 5 kgf/$cm^2$.

In Comparative Example 2, the amount of kaolin used was 7% and the total for raw materials of for cordierite formation was 60% and the viscosity (as an indication of lubricity) during extruding was 5.2 MPa.s and the viscosity (as an indication of shape stability) was 33 MPa.s. The formed honeycomb had cell deformation and surface cutting/fine splitting and no satisfactory formed structure could be obtained and the fired honeycomb structure had an isostatic fracture strength of only 8 kgf/$cm^2$.

In Comparative Example 3, the total of raw materials for cordierite formation was 62% and the viscosity (as an indication of lubricity) during extruding was 5.6 MPa.s and the viscosity (as an indication of shape stability) was 38 MPa.s. The formed honeycomb had cell deformation and surface cutting/fine splitting and no satisfactory formed structure could be obtained and the fired honeycomb structure had an isostatic fracture strength of only 6 kgf/$cm^2$. Further, the fired honeycomb structure had a thermal expansion coefficient of 1.0×$10^{-6}$/°C. and accordingly an average thermal shock resistance of only 650° C.

In Comparative Example 4, since the raw materials for cordierite formation were not subjected to sifting, the large particles having sizes of not smaller than the slit width of extrusion die plugged the slits of extrusion die and the formed honeycomb structure had 25 defective ribs. As a result, the fired honeycomb structure had a low strength, i.e. an isostatic fracture strength of only 8 kgf/cm$^2$.

As described above, according to the present process for producing a cordierite-based ceramic honeycomb structure, there can be obtained a cordierite-based ceramic honeycomb structure of small wall thickness and high cell density; the formability during extruding, particularly lubricity and shape stability can be improved; and the honeycomb structure obtained can have improved mechanical strength (isostatic fracture strength) and improved catalyst coatability.

What is claimed is:

1. A process for producing a cordierite-based ceramic honeycomb structure, which comprises;

kneading raw materials for cordierite formation with a forming aid to obtain a raw material batch, subjecting the raw material batch to extruding to obtain a formed honeycomb structure, and subjecting the formed honeycomb structure to drying and firing in this order to obtain the cordierite-based ceramic honeycomb structure whose crystal phase is composed mainly of cordierite, wherein the raw material batch contains 65% by weight or more of raw materials for cordierite formation comprising talc, kaolin and aluminum hydroxide and having crystal water, and said kaolin has an average particle diameter of 5 μm or more and a BET specific surface area of 10 m$^2$/g or less and is contained in the raw material batch in an amount of 10% by weight or more.

2. A process for producing a cordierite-based ceramic honeycomb structure according to claim 1, wherein the kaolin has a value of (average particle diameter)/(BET specific surface area), of 1 or more.

3. A process for producing a cordierite-based ceramic honeycomb structure according to claim 1, wherein the raw materials for cordierite formation have, by sifting, a particle size of less than the slit width of the extrusion die used.

4. A process for producing a cordierite-based ceramic honeycomb structure according to claim 1, wherein, at the time of extruding, an extrusion die having a slit width of 110 μm or less is used.

5. A process for producing a cordierite-based ceramic honeycomb structure according to claim 1, wherein the honeycomb structure has a thermal expansion coefficient of $0.8 \times 10^{-6}$/°C. or less between 40° C. and 800° C., in the passage direction, a porosity of 24 to 38%, and an isostatic strength of 10 kgf/cm$^2$ or more.

* * * * *